G. TATLOCK & S. NEWBY.
CORN-PLANTER.

No. 188,694.  Patented March 20, 1877.

WITNESSES:
E. Wolff
J. H. Scarborough

INVENTORS
G. Tatlock
S. Newby
BY Munn
ATTORNEYS.

UNITED STATES PATENT OFFICE.

GEORGE TATLOCK AND STANFORD NEWBY, OF NEW PHILADELPHIA, IND.

IMPROVEMENT IN CORN-PLANTERS.

Specification forming part of Letters Patent No. 188,694, dated March 20, 1877; application filed January 6, 1877.

*To all whom it may concern:*

Figure 1:
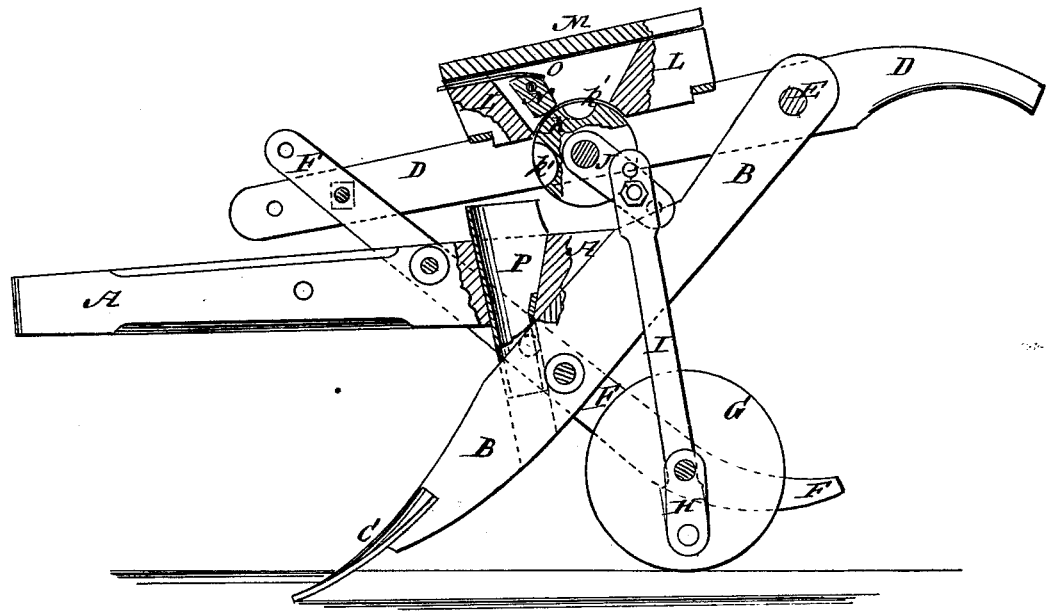
Figure 2:
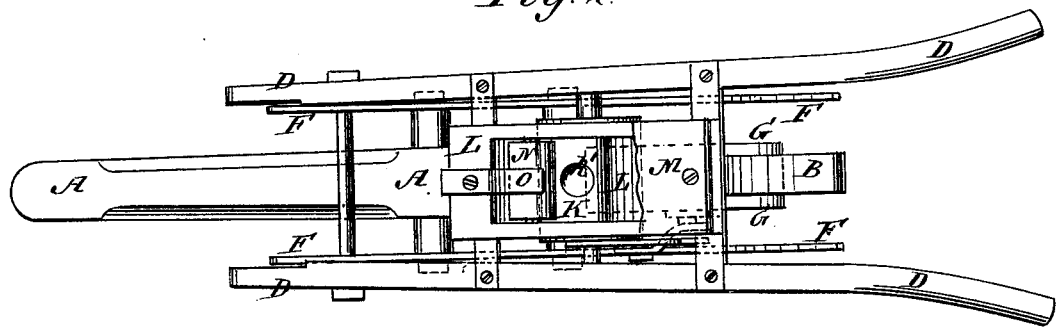

Be it known that we, GEORGE TATLOCK and STANFORD NEWBY, of New Philadelphia, in the county of Washington and State of Indiana, have invented a new and useful Improvement in Corn-Planter, of which the following is a specification:

Figure 1 is a vertical longitudinal section of our improved planter, part being broken away to show the construction. Fig. 2 is a top view of the same, part of the seed-box cover being removed.

Similar letters of reference indicate corresponding parts.

The object of this invention is to furnish an improved machine for planting corn, which will open a furrow to receive the seed, drop the seed at regular distances apart, and cover it, and which shall be so constructed that the planting device can be detached and the rest of the machine used as a plow or cultivator.

The invention will first be described in connection with the drawing, and then pointed out in the claims.

A is the plow-beam, to the rear end of which is attached the standard B. To the lower end of the standard B is attached the plow C. The standard B projects above the beam A, and is connected with the handles D by a round, E. The forward ends of the handles D are bolted to the upper ends of the two side bars F, which are bolted to the beam A and to the standard B, blocks being interposed between the said bars and the said beam and standard, to bring the bars to the proper distance apart. In bearings in the lower parts of the bars F revolve the journals of the wheel G, which is made wide to adapt it to serve as a roller to cover the seed. To one of the journals of the wheel G is attached, or upon it is formed, a crank, H, to which is pivoted the lower end of the connecting-rod I. The upper end of the connecting-rod I is pivoted to the crank J, formed upon or attached to the journal of the dropping-cylinder K. The journals of the dropping-cylinder K revolve in bearings in the handles D. The upper part of the dropping-cylinder K fits into a cavity in the bottom of the seed-hopper L, and forms a part of said bottom. The seed-hopper L is connected with, and supported from, the handles D, and is provided with a cover, M. In the forward part of the hopper L is pivoted a block, N, the lower edge of which rests upon the face of the cylinder K to prevent any more seeds from being carried out by said cylinder than enough to fill its dropping cavity or hole $k'$. The upper edge of the block N is rounded off, and upon it rests the free end of a spring, O, the other end of which is attached to the forward end of the hopper L. The spring O allows the block N to yield should a kernel be caught by it, to prevent said kernel from being crushed. Several holes, $k'$, of different sizes, are formed in the cylinder K, and several holes are formed in the crank J and connecting-rod I, to receive their pivoting-pin, so that the said dropping-cylinder may be adjusted to drop more or less seed for a hill, as may be required.

By detaching the side bars, the wheel, the dropping-cylinder, and the hopper, and bolting the forward ends of the handles to the plow-beam, the machine is adjusted for use as a plow or cultivator. The seed is received from the dropping-cylinder K, and conducted to the ground by the spout P, which passes down through holes in the beam A and standard B.

Having thus described our invention, we claim as new and desire to secure by Letters Patent—

1. The handles D E, supported on extensions of the standard B, in combination with adjustable bars F, beam A, and hopper L, as shown and described.

2. A handle-frame, D, pivoted to a rear extension of standard B, and adapted to be connected in front either with the beam A or bars F, as and for the purpose set forth.

GEORGE TATLOCK.
STANFORD NEWBY.

Witnesses:
CHRISTOPHER H. BUNDY,
BENJAMIN F. HOWELL.